E. R. WHITE.
SPRING WHEEL.
APPLICATION FILED MAR. 26, 1913.

1,082,380.

Patented Dec. 23, 1913.
2 SHEETS—SHEET 1.

Witnesses
J. C. Hennesy
V. B. Hillyard.

Inventor
Edmond R. White,
By Victor J. Evans
Attorney

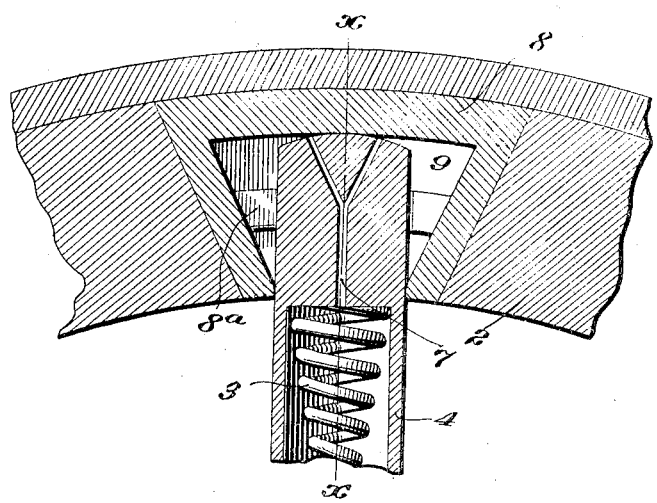
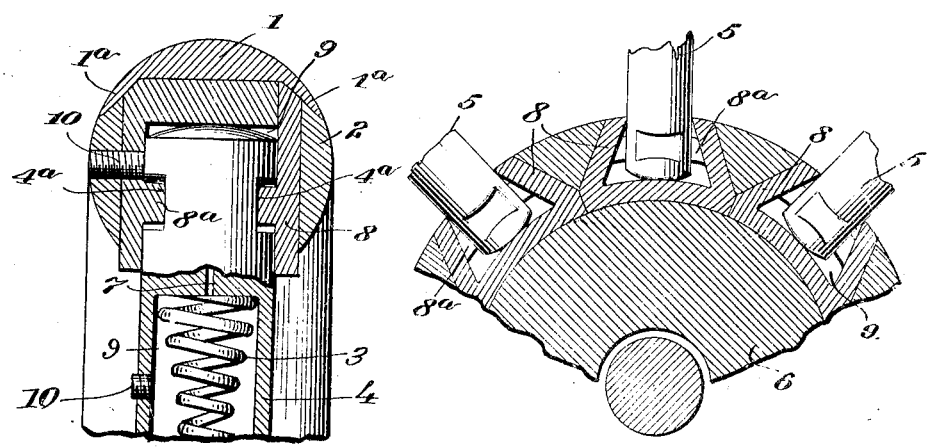

UNITED STATES PATENT OFFICE.

EDMOND R. WHITE, OF PLATTSBURG, NEW YORK.

SPRING-WHEEL.

1,082,380.　　　Specification of Letters Patent.　　Patented Dec. 23, 1913.

Application filed March 26, 1913. Serial No. 756,944.

*To all whom it may concern:*

Be it known that I, EDMOND R. WHITE, a citizen of the United States, residing at Plattsburg, in the county of Clinton and State of New York, have invented new and useful Improvements in Spring-Wheels, of which the following is a specification.

The invention provides a vehicle wheel having a yieldable tread so as to neutralize shock and vibration and thereby prevent undue wear upon the running gear and parts mounted thereon and to add largely to the comfort of the occupant of the vehicle.

The invention consists of a rim of peculiar formation and sectional spokes having a peculiar joint with the rim and hub, whereby the rim is permitted to have a limited movement to compensate for jar and vibration, the sections of the spokes having an interposed cushion, preferably consisting of a conical spring formed of wire of proper gage according to the load to be sustained.

The invention consists of the novel features, details of construction and combination of parts, which hereinafter will be more particularly set forth, illustrated in the accompanying drawings, and pointed out in the appended claim.

Figure 1:
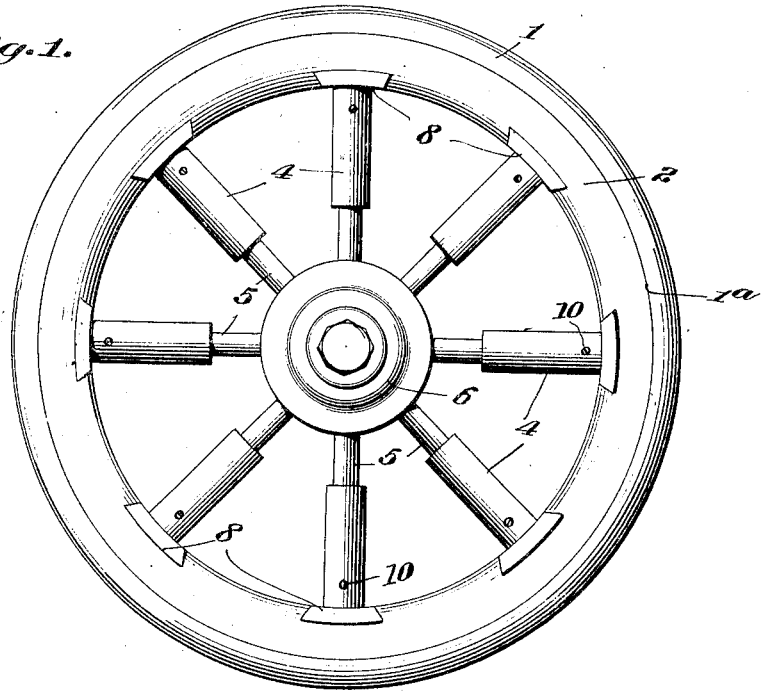
Figure 2:
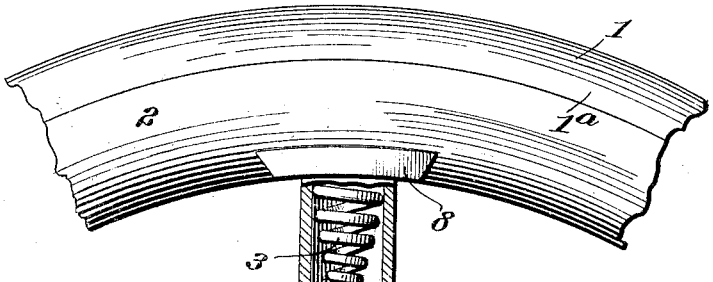

Referring to the drawings, forming a part of the specification, Figure 1 is a view in elevation of a vehicle wheel embodying the invention. Fig. 2 is a detail view of a portion of the wheel having the outer member of one of the spokes in section. Fig. 3 is an enlarged sectional view, showing the connection between the rim and the outer member or section of one of the spokes. Fig. 4 is a section on the line $x$—$x$ of Fig. 3. Fig. 5 is a detail view, showing more clearly the joint between the inner member or section of a spoke and the hub.

Corresponding and like parts are referred to in the following description, and indicated in all the views of the drawings, by the same reference characters.

The wheel comprises a tire 1 which is preferably of steel so as to resist wear, said tire having side flanges 1ᵃ which flare. The rim 2 may be of any construction or material and preferably consists of aluminum. The outer or tread portion of the rim 2 is constructed to receive the tire 1, flanges 1ᵃ preventing lateral displacement of the tire. The rim is provided upon its inner side at regular intervals in its circumferential length with tapered sockets or recesses in which are fitted the boxes 8 of steel, the side walls of such boxes being parallel, whereas their end walls are outwardly flared. Ribs 8ᵃ are formed upon opposite side walls of the boxes 8 and are designed to form positive connecting means between such boxes and the outer ends of the spokes. The ribs 8ᵃ are curved to conform to the curvature or diameter of the rim.

The hub 6 may be of any construction and is preferably provided with ball bearings to reduce the friction between it and the axle spindle to the smallest amount possible.

The spokes comprise outer members or sections 4 and inner members or sections 5, said spokes being jointed at their ends with the rim and hub of the wheel to admit of the spokes having a limited oscillatory movement in the plane of the wheel whereby provision is had for yielding of the rim to neutralize shock and vibration. The joints between the ends of the spokes and the rim and hub are similar and are such as to prevent lateral play of the spokes and rim. The outer sections or members 4 are hollow and the sections or members 5 telescope therein. Expansible conical springs 3 are interposed between the outer ends of the spoke sections 4 and 5 and are located within the sections 4 and are sufficiently stout to sustain the load for which the wheel is designed. The conical form of spring is preferred, since the movement offered by the coils of such spring is variable. The outer ends of the sections or members 5 are formed with heads 5ᵃ which fit snugly within the space of the complementary sections 4, thereby preventing any lateral movement between the spoke sections in any direction. The outer ends of the spoke sections or members 4 are made rounding to engage the inner walls of the boxes 8. Grooves 4ᵃ are formed in opposite sides of the parts 4 to receive the ribs 8ᵃ, whereby positive interlocking connection is had between the spokes and rim. The outer ends of the spokes entering the boxes 8 are of a width to cause the sides of the spoke ends to fit close against the side walls of the boxes 8, thereby preventing any lateral play between such parts. The openings at the inner ends of the boxes 8 correspond with a cross sectional area of the spoke ends in the plane of the inner side of the rim so as to provide a close fit between the spoke ends and boxes to exclude dust and foreign matter and to prevent waste of lubricant. The outward flare of the end walls of the boxes 8 provides for a limited oscillatory movement of the spokes which is essential to allow the rim of the wheel to yield by the action of the springs 3 and the changing of the load sustaining point. The space 9 formed within each spoke section or member 4 is adapted to receive a lubricant, the latter being supplied to such space through a plug controlled opening 10 formed in a side of the spoke section. An oil duct 7 leads the lubricant from the space 9 to branches which open through the extremity of the section 4 so as to deliver the lubricant into the box 8 for lubricating the wearing parts between the outer ends of the spokes and the walls of the boxes. The spoke sections 5 are connected with the hub 6 in a manner similar to the connection between the spoke section 4 and the rim to admit of a limited oscillatory movement of the spokes in the plane of the wheel. The detailed description of the joint between the rim and outer spoke sections will suffice for a clear understanding of the joint or connection between the hub 6 and inner ends of the spokes, corresponding parts being designated by like reference numerals.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention what is claimed as new, is:—

In a vehicle wheel a joint between a spoke and the rim or hub, said joint comprising a box having its end walls flared and its side walls formed with opposed ribs, and a spoke end entering such box and provided at opposite sides with grooves to receive the ribs and of a size to fill the entrance opening of the box, said spoke adapted to have an oscillatory movement in the direction of the elongation of the box provided by the flare of its end walls.

In testimony whereof I affix my signature in presence of two witnesses.

EDMOND R. WHITE.

Witnesses:
GEORGE PARSONS,
GEORGE C. WHITE.

Copies of this patent may be obtained for five cents each, by addressing the "Commissioner of Patents, Washington, D. C."